June 10, 1958 H. P. HARLE 2,837,900
REFRIGERATOR FROZEN FOOD COMPARTMENT MOUNTING STRUCTURE
Filed Aug. 13, 1956
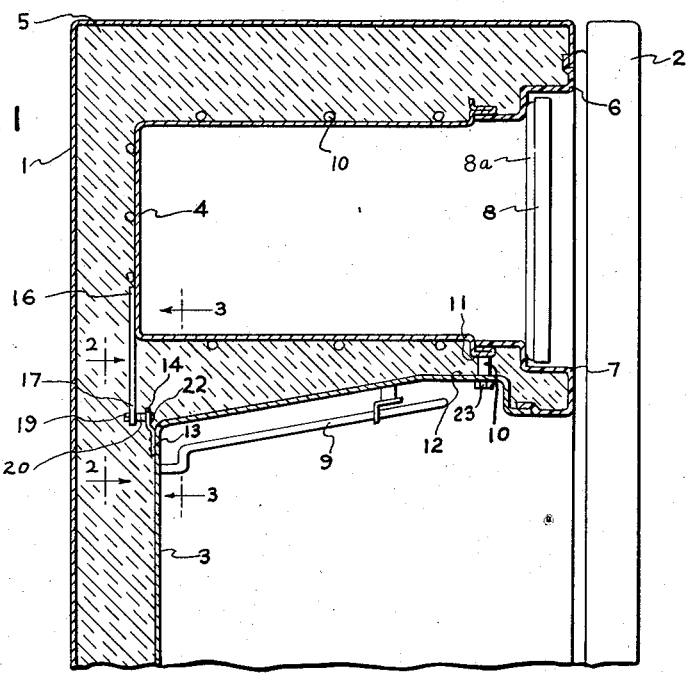
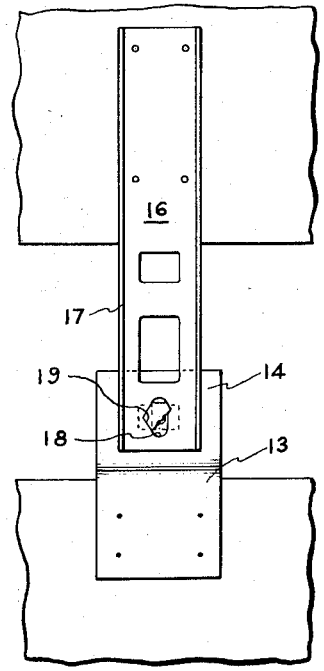
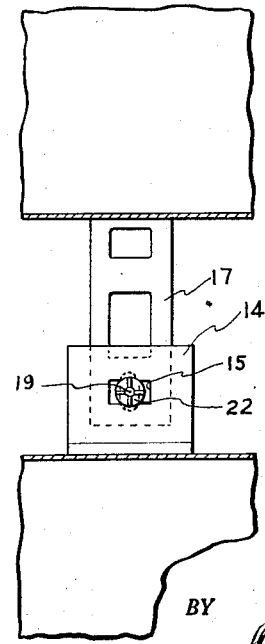
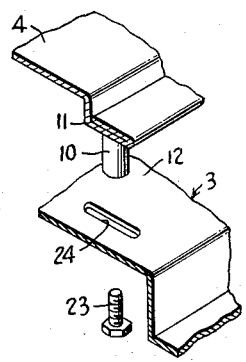
INVENTOR.
HAROLD P. HARLE
BY
HIS ATTORNEY

United States Patent Office 2,837,900
Patented June 10, 1958

2,837,900

REFRIGERATOR FROZEN FOOD COMPARTMENT MOUNTING STRUCTURE

Harold P. Harle, Louisville, Ky., assignor to General Electric Company, a corporation of New York Application August 13, 1956, Serial No. 603,487

3 Claims. (Cl. 62—89)

The present invention relates to mounting structure for mounting a frozen food compartment within the outer casing of a refrigerator, and more particularly to adjustable mounting structure for mounting the frozen food compartment on the food storage compartment or liner.

It is an object of the present invention to provide an improved mounting structure for mounting the frozen food compartment above the food storage liner.

More specifically, it is an object of the present invention to provide a mounting structure that will permit adjustment of the position of the compartment with respect to the food storage liner and the outer casing.

Further objects and advantages of the invention will become apparent as the following description proceeds, and the features of novelty which characterize the invention will be pointed out with particularity in the claims annexed to and forming a part of this specification.

In accordance with the present invention there is provided a refrigerator having an outer casing enclosing a food storage liner and a frozen food compartment mounted above the liner. For mounting the compartment above the liner there is provided an adjustable mounting structure comprising a pair of thermal insulating spacers secured to the bottom of the compartment thereof and adjustably attached to the top of the liner through slots formed in the top of the liner and disposed normal to the front of the liner. In order to support the rear of the compartment above the liner, a pair of brackets are provided, one extending downwardly from the compartment and the other extending upwardly from the liner and secured together by a connecting and thermal insulating means which passes through elongated slots formed in the ends of the brackets. The slots are positioned with their longitudinal axes transverse to each other to allow horizontal and vertical adjustment of the rear of the compartment with reference to the liner.

For a better understanding of the invention, reference may be had to the accompanying drawing in which:

Fig. 1 is a partial, cross sectional, elevation view of a refrigerator having the mounting structure of the present invention for mounting the evaporator above the food storage liner;

Fig. 2 is a detail view of the rear mounting structure taken along line 2—2 of Fig. 1;

Fig. 3 is a detailed view taken along 3—3 of Fig. 1 showing the opposite side from Fig. 2 of the rear mounting structure; and Figure 4 is an exploded view showing the arrangement of one of the slots in the liner.

Referring now to Fig. 1 there is shown a portion of a refrigerator cabinet having an outer shell or casing 1 with a door 2 hinged thereto, the casing enclosing a food storage liner 3 and a frozen food compartment 4. The spaces between the outer casing 1, the liner 3, and the compartment 4 are filled with a suitable heat insulating material 5. A thermal insulating breaker strip is provided having an upper portion 6 closing the space between the outer casing 1 and the frozen food compartment 4 at the front of the refrigerator. The lower portion 7 of the breaker strip forms a suitable heat insulating connection between the frozen food compartment 4 and the food storage liner 3. The compartment 4 is shaped to provide a chamber for storing frozen foods therein, and this chamber is closed by a door 8 having a gasket 8a which engages the breaker strip.

In order to refrigerate the food storage compartment an evaporator or cooling unit 9 is provided. This is positioned near the top of the food storage liner 3 and is supported by suitable brackets. A second evaporator or cooling unit 10 is provided adjacent to or integral with the food freezer compartment. The cooling units may be refrigerated by circulation of a refrigerant which in turn is passed through a suitable condenser and compressor unit in the conventional manner. The evaporators keep the food storage compartment slightly above freezing temperature and maintain the food freezer compartment below freezing temperature.

The compartment 4 is positioned near the top of the casing and is supported from the liner 3 by an adjustable mounting structure which also thermally insulates the frozen food compartment 4 from the food storage liner 3. Thus as can be seen in Fig. 1, a pair of thermal insulating spacers 10 are secured to the frozen food compartment 4 adjacent the bottom front corners thereof. As can be seen in the illustration, the spacers 10 are secured to the front flange 11 of the compartment and rest upon the top 12 of the liner 3 where they are attached to the liner by a screw or a bolt 23 passing through longitudinal slots 24 formed in the top 12 of the liner, the slots being disposed normal to the front or opening of the liner. This may best be seen in Fig. 4. Thus during assembly of the refrigerator the compartment may be adjusted front to back with respect to the food storage liner 3 simply by loosing the fastening means securing the spacers to the top of the liner and adjusting the position of the spacers 10 along the slots formed in the liner.

In order to support the rear portion of the frozen food compartment 4 and permit adjustment thereof there is attached to the rear of the food storage liner 3, in a suitable manner such as welding or brazing, a liner bracket or first bracket 13 having an end 14 extending upwardly toward the top of the casing. This upwardly extending end 14 contains a slot 15. Attached to the rear of the compartment 4, is a second bracket or compartment bracket 16 having an end 17 extending downwardly toward the food storage liner 3 and in alignment with the liner bracket 13 but spaced therefrom. The end of the compartment bracket 16 is also provided with a slot 18. However, the slot of the compartment bracket 16 is formed transverse to the slot of the liner bracket and is disposed upon the end of the compartment bracket in such a manner that a portion of the slot 18 aligns with a portion of the slot 15 of the liner bracket 13. In the embodiment illustrated, the slot 15 in the liner bracket 13 is disposed with its longitudinal axis in a horizontal position and the slot 18 of the compartment bracket 16 is disposed with its longitudinal axis in a vertical position. Thus as can be seen in Figs. 2 and 3, the slots 15 and 18 are in alignment at some portion of their length.

The ends of the brackets 14 and 17 are secured together by a connecting means extending through the slots and adjustably fastened therein. As can be seen in Fig. 1, the connecting means is in the form of a bolt 19 having a plastic spacer 20 forming a thermal insulating portion between the two brackets. The bolt 19 is inserted through the slot 15 with the head forcing the liner bracket 13 against the spacer 20. The bolt 19 extends through the spacer 20 and the slot 18 whereupon the evaporator bracket 16 is assembled and tightened to the liner bracket 13 through use of a plastic snap nut 22. The purpose of the plastic snap nut 22 is to provide a thermal insulation between the bolt 19 and the upwardly extending end 14 of the liner bracket 13. During assembly of the evaporator compartment 4 above the food storage liner 3, by merely loosening the plastic nut 22 and the fastening means or bolts 23 securing the spacers 10, on the front of the frozen food compartment, to the liner 3 and sliding the bolt 19 vertically up or down within the slot 18 or horizontally side to side within the slot 15, the evaporator may be adjusted to its correct position with respect to the casing 1 or the liner 3. It is also within the scope of the present invention to form the spacer 20 and the plastic snap nut 22 as parts of an integral piece of thermal insulating material. In this case the snap nut portion would be inserted through the slot 15 prior to placing the bolt 19 through the slot 18 and through the spacer-snap nut unit.

By the present invention there has been provided a mounting arrangement for evaporator which will permit adjustment in the position of the evaporator during assembly in order to align the front of the evaporator with respect to the food storage liner and the outer casing. Moreover this mounting structure provides for thermal insulation between the frozen food evaporator and the food storage liner, is of simple construction and easy to assemble.

While in accordance with the patent statutes there has been described what at present is considered to be the preferred embodiment of the invention, it will be obvious to those skilled in the art that various changes and modifications may be made therein without departing from the invention and it is, therefore, the aim of the appended claims to cover all such changes and modifications as fall within the true spirit and scope of the invention.

What I claim as new and desire to secure by Letters Patent of the United States is:

1. A refrigerator comprising an outer casing, a food storage liner within said casing, a frozen food evaporator mounted above said liner, a mounting structure for mounting said evaporator above said liner comprising a pair of thermal insulating spacers secured to the bottom of said evaporator adjacent the front thereof, adjustable connecting means securing said thermal insulating spacers to the top of said liner through slots formed in the top of said liner designed to permit adjustment normal to the front of said liner, a first bracket having one end secured to the rear of said liner and having the other end extending upwardly from said liner, said upwardly extending end having a slot disposed therein, a second bracket having one end secured to the rear of said evaporator and the other end extending downwardly from said evaporator to a position parallel to said upwardly extending end of said first bracket, said downwardly extending end having a transverse slot therein, and connecting means connecting said first and second brackets through said slots to provide a horizontally and vertically adjustable support for said evaporator above said liner.

2. A refrigerator comprising an outer casing, a food storage liner within said casing, a frozen food evaporator mounted above said liner, a mounting structure for mounting said evaporator above said liner comprising a pair of thermal insulating spacers secured to the bottom of said evaporator adjacent the front thereof, connecting means securing said thermal insulating spacers to said liner through slots formed in the top of said liner for permitting adjustment normal to the front of said liner, a first bracket having one end secured to the rear of said liner and having the other end extending upwardly from said liner, said upwardly extending end having a horizontal slot disposed therein, a second bracket having one end secured to the rear of said evaporator and the other end extending downwardly from said evaporator to a position parallel to said first bracket, said second bracket having a vertically disposed slot in said downwardly extending end, and connecting means connecting said first and second brackets through said slots therein thereby providing a horizontally and vertically adjustable support for the rear of said evaporator.

3. A refrigerator comprising an outer casing, a food storage liner within said casing, said liner having a pair of longitudinal slots formed in the top thereof normal to the front of said liner, a frozen food evaporator mounted above said liner, an adjustable mounting structure for mounting said evaporator above said liner comprising a pair of thermal insulating spacers secured to the bottom of said evaporator adjacent the front thereof, connecting means connecting said spacers to the top of said liner through said slots formed in the top of said liner, a first bracket having one end secured to the rear wall of said liner and having the other end extending upwardly from said liner, said upwardly extending end having a horizontal slot disposed therein, a second bracket having one end secured to the rear wall of said evaporator and the other end extending downwardly from said evaporator to a position parallel to the upwardly extending end of said first bracket and spaced therefrom, said downwardly extending end having a vertically disposed slot therein, a thermal insulating spacer between said first and second brackets having a hole in alignment with said slots in the ends of said brackets, and a connecting means extending through said slots and said thermal insulating spacer for securing said ends of said brackets together thereby providing a horizontally and vertically adjustable support for the rear of said evaporator.

References Cited in the file of this patent

UNITED STATES PATENTS

| | | |
|---|---|---|
| 2,537,314 | Mortensen | Jan. 9, 1951 |
| 2,589,549 | Iwashita | Mar. 18, 1952 |
| 2,732,272 | Mann | Jan. 24, 1956 |